United States Patent [19]

Torres

[11] Patent Number: 4,657,040
[45] Date of Patent: Apr. 14, 1987

[54] BYPASS REVERSE FLOW VALVE

[75] Inventor: Jorge Torres, Newbury Park, Calif.

[73] Assignee: HR Textron Inc., Valencia, Calif.

[21] Appl. No.: 801,540

[22] Filed: Nov. 25, 1985

[51] Int. Cl.[4] .................... F16K 17/18; B01D 35/14
[52] U.S. Cl. ................................. 137/110; 137/493.2;
137/533.31; 137/599.1; 210/130; 210/136
[58] Field of Search ............. 137/599.1, 493.2, 625.29, 137/493.9, 110 I, 533.31, 533.17, 493.1, 493.3, 493.4, 493.5, 493.6; 210/133, 130, 136

[56] References Cited

U.S. PATENT DOCUMENTS

| | | | |
|---|---|---|---|
| 1,617,711 | 2/1927 | Hennebőhle | 137/493.9 X |
| 1,844,222 | 2/1932 | Jasper | 137/533.31 X |
| 2,486,164 | 10/1949 | Jerome | 137/493.6 X |
| 2,499,614 | 3/1950 | Thornhill | 137/533.31 |
| 3,323,468 | 6/1967 | Thompson | 137/533.17 X |
| 3,625,248 | 12/1971 | Lhotellier | 137/493.6 |
| 3,656,621 | 4/1972 | Barthe | 210/133 |
| 3,996,137 | 12/1976 | Cooper | 210/130 |
| 4,249,566 | 2/1981 | Deane | 137/533.17 X |

Primary Examiner—Martin P. Schwadron
Assistant Examiner—Stephen M. Hepperle
Attorney, Agent, or Firm—Nilsson, Robbins, Dalgarn, Berliner, Carson & Wurst

[57] ABSTRACT

A filter assembly including a housing and a filter element which includes a bypass/reverse flow valve coaxially disposed within the housing with the filter element and includes a central opening therethrough coaxially aligned with the opening in the filter element through which filtered fluid passes. In the forward flow direction a bypass valve opens responsive to a predetermined pressure differential appearing across the filter element to permit unfiltered fluid to flow from the source to the load without passing through the filter element. In the reverse flow direction, from the load to the source, a check valve closes and applied full load pressure to the reverse flow valve causing it to open with a second differential pressure which is lower than the bypass differential pressure to thereby permit free flow of fluid from the load to the source without passing through the filter.

8 Claims, 6 Drawing Figures

BYPASS REVERSE FLOW VALVE

BACKGROUND OF THE INVENTION

This invention relates generally to the filtering of fluids under pressure and more particularly to such a system which provides for bypass of the filter responsive to its becoming clogged and, in addition thereto, means for reverse flow of the fluid also bypassing the filter.

Various systems are known which require the flow of fluid under pressure from a source thereof to a load and also from the load to the source. Typical of such systems are the hydrostat transmission system composed of a hydraulic pump and a hydraulic motor coupled together in a closed fluid flow loop.

It is typical in such systems to provide a filter interposed to clean the fluid flowing from the source to the load. The filter removes foreign materials from the fluid which may be suspended therein from various sources. As the filter tends to become clogged from the removal of the suspended material, the flow through the filter diminishes while the differential fluid pressure across the filter increases. In hydrostat transmission systems which typically operate at quite high pressures, if the clogging becomes substantial, the filter may rupture dumping its load of contaminants into the flow of fluid to the load. It is thus desirable if the filter element is not changed prior to becoming substantially clogged to provide a bypass for flow from the source to the load responsive to an increase beyond a predetermined threshold of the differential fluid pressure across the filter element.

At the same time, when flow is from the load to the source it is desirable for the fluid to not pass through the filter. If such flow does pass through the filter it would unload the material removed by the filter and carry those foreign particles back into the source or pump and possibly deposit some of them in the motor or load with resultant destructive action on their moving parts. Therefore it is customary to provide a bi-directional valve in the system to provide bypass flow around the filter should it become clogged as well as to provide reverse flow through a path which also bypasses the filter.

As used in this application the term "forward flow" is applied to the direction of flow of the fluid through a given fluid path of the system from the source or pump to the load. "Reverse flow" is flow of fluid from the load or the motor to the source or the pump while the term "bypass flow" is referred to as that flow from the source to the load but not through the filter.

There are various bi-directional valves currently in existence for use in such systems. Typical of such systems are those disclosed in U.S. Pat. Nos. 3,497,929, 3,487,932, 3,625,248, 3,807,442, 3,908,693, 3,996,137 and 4,439,984.

While the systems including the valves shown in the prior art patents above referred to operate well under most conditions, they are complex in construction, expensive to manufacture, provide a slow response to change in direction of flow of the fluid from forward to reverse and, in some instances, the bypass valves are separate from the reverse flow valves. Because of the stringent demands upon a bi-directional valve in such a system to preclude malfunctioning of the system, the design of a bi-directional valve for inclusion in such a system which is capable of operating in a confined space and which can operate quickly to provide for the full flow immediately upon change of flow direction as required by a hydrostatic transmission system has proved to be a complex and perplexing problem, particularly when coupled with the requirements for low cost and ease of installation and maintenance.

SUMMARY OF THE INVENTION

A bypass/reverse flow valve disposed coaxially with a tubular filter element seated within a housing of a filter assembly and including ring valve means having an opening disposed coaxially with the tubular filter element and including seat and seal means. The ring valve means is movable responsive to a first predetermined differential across the filter element to cause separation of the seat and seal means to provide flow of fluid under pressure from a source to a load by passing the filter element. Reverse flow check valve means is disposed to close the opening through the ring valve to prevent fluid flow from the outlet to the inlet through the filter element. The check valve, responsive to the reverse flow, generates a second differential pressure causing separation of the seat and seal means to allow fluid to flow from the load to the source without passing through the filter, the second differential pressure being less than the first differential pressure.

DETAILED DESCRIPTION

Figure 1:
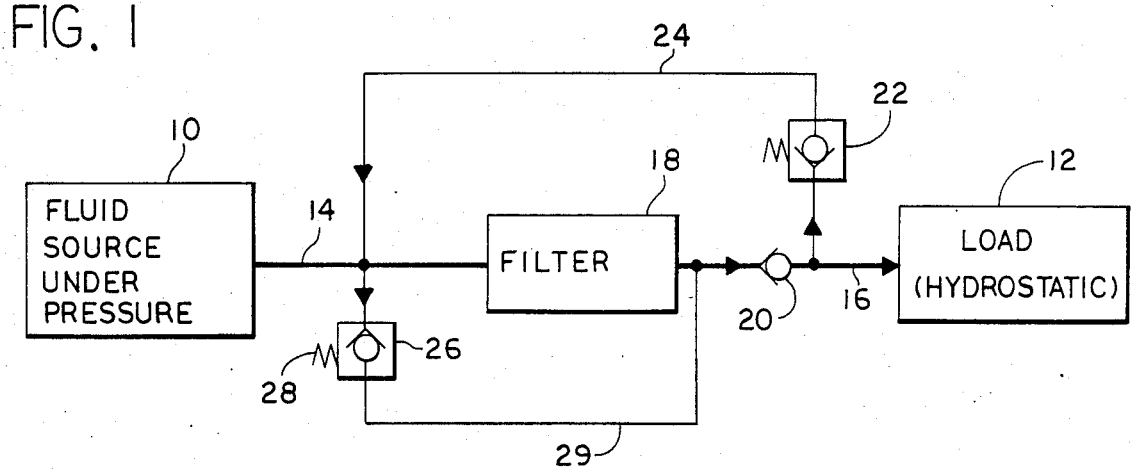
FIG. 1 is a schematic diagram illustrating the principles of the present invention.

As shown in FIG. 1 to which reference is hereby made, a system constructed in accordance with the present invention includes a source 10 of fluid under pressure such for example as hydraulic fluid or the like. The source may include a pump or other type of system to provide a continuous flow of fluid under pressure. The fluid under pressure flows from the source 10 to a load 12 through appropriate passageways or conduits 14–16. The load 12 may be any load known but typically will be a hydrostat transmission system as is well known in the art wherein fluid would also flow through the passageways or conduits 14–16 from the load 12 to the source 10. Interposed between the passageways 14–16 is a filter system 18. In accordance with the typical hydrostat transmission system the filter system 18 functions to remove foreign contaminants as suspended in the fluid prior to its application to the load. Thus the typical flow path for fluid under pressure from the source 10 to the load 12 is through the conduit 14, the filter 18 and the conduit 16 as shown by the heavy lines. In the event fluid is to flow from the load 12 to the source 10 as is typical in hydrostat transmission systems, a check valve 20 between the filter 18 and the load 12 prevents reverse flow of the fluid through the filter 18. Upon closure of the check valve 20 in response to reverse flow, a spring biased valve 22 opens to permit reverse flow through the conduit 24 back to the source 10. Typically the valve 22 has a relatively low threshold pressure which is only sufficient to preclude flow therethrough during the normal flow of fluid through the conduits 14 and 16 to the load 12 in the forward flow direction.

As the filter 18 removes contaminants from the fluid flowing through the conduits 14 and 16 and gradually becomes clogged, the flow therethrough reduces and the differential pressure thereacross increases. This differential pressure is applied across a spring loaded valve 26. When the differential pressure reaches a predetermined threshold as determined by the spring 28 of the valve 26, the valve opens bypassing the filter 18 and permitting flow of fluid through the passageway 29 to the passageway 16 through the open check valve 20, thereby permitting fluid to continue to be applied to the load 12 even though the filter has become clogged. Such bypassed, unfiltered fluid is necessary to continue the operation of the load 12. Obviously it is desirable to provide a clean filter element so that contaminants that may be in the fluid are removed. Typically, filter systems such as 18 will include an indicator which provides a visual or audible indication to the operator that the filter is clogged and should be changed. Such an indicator forms no part of the present invention but is merely mentioned to provide a complete description of such a system.

Although the valves 20, 22 and 26 are each shown schematically in FIG. 1 as separate valves, in accordance with the present invention, these valves are incorporated into a single assembly. The single assembly is designed for simple installation into existing filter assemblies to provide the reverse flow and/or bypass capabilities without the necessity of complex and expensive re-design of filter systems. The reverse flow/bypass valve constructed in accordance with the present invention may be installed by simply removing fittings which exist within present filter assemblies and replacing the same with the reverse flow/bypass valve constructed in accordance with the principles of the present invention. The capability to provide this bypass/reverse flow feature for existing filter assemblies is thus provided.

Figure 2:
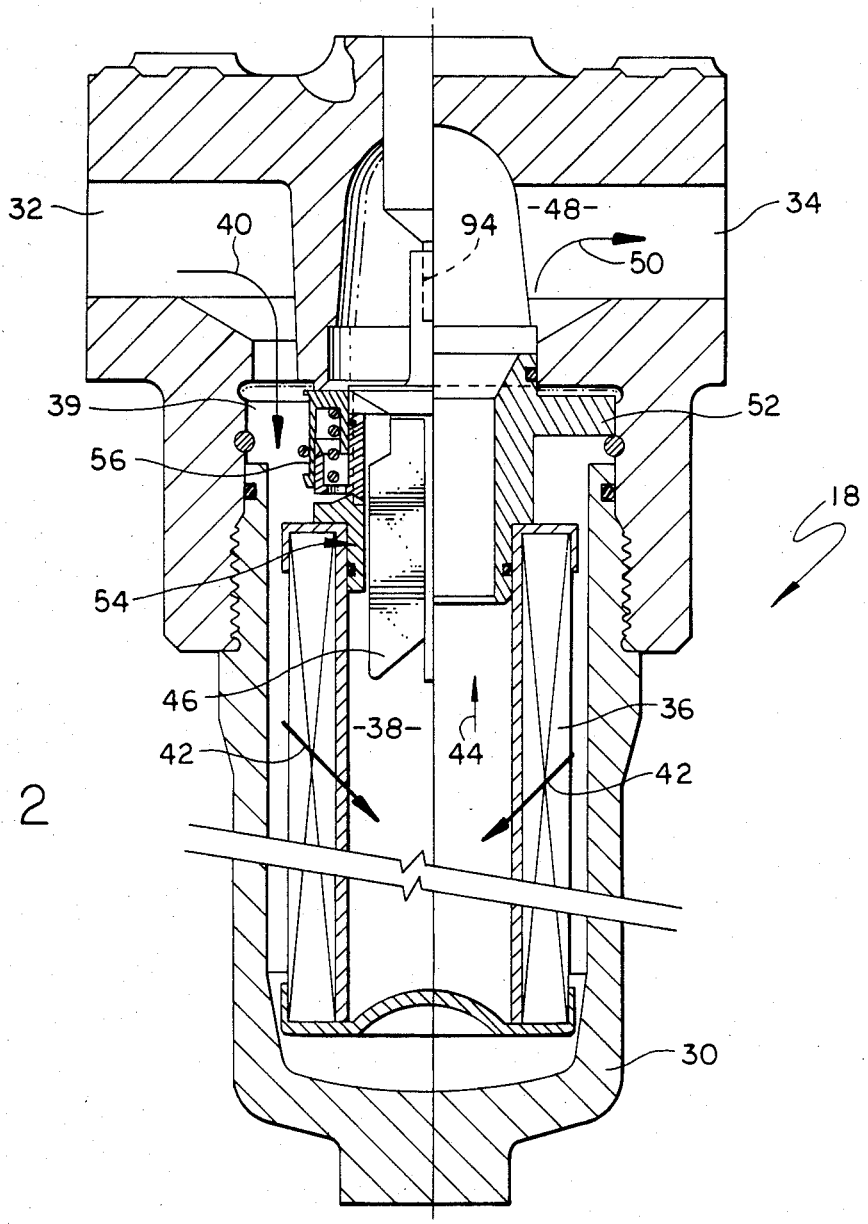
FIG. 2 is a cross sectional plan view in schematic form illustrating one form of a system incorporating the present invention.

Referring now more particularly to FIG. 2, the filter system constructed in accordance with the present invention is illustrated in greater detail. As is therein shown, the filter 18 includes a housing 30 having an inlet port 32 and an outlet port 34 to which the conduits 14 and 16 would be attached, respectively. Disposed within the housing 30 is a filter element 36 which may be any filter element desired which may be replaceable and/or cleanable. As is illustrated, typically the filter element 36 will be a tubular filter element having an opening 38 through which fluid after filtering flows. Typically the flow path for the fluid being filtered is through the inlet port 32 and into the cavity 38 as shown by the arrow 40. The fluid then flows through the filter element as shown by the arrows 42 and into the flow passage 38. The fluid then flows outwardly as shown by the arrow 44 past the check valve 46 (which will be described in further detailed hereinafter) and out through the chamber 48 and the outlet port 34 as indicated by the arrow 50.

In accordance with the prior art a fitting 52 would be disposed within the housing 30 and would have dimensions such as to receive the filter element 36 therewithin and to provide the effective seals so that the fluid would necessarily flow from the outside inwardly as indicated by the arrows 42 through the filter element and out through the outlet port 34. However, in accordance with the principles of the present invention, the fitting 52 is replaced by an appropriate adaptor 54 which will receive the filter element in accordance with the foregoing stated principles to provide the appropriate seals and, at the same time, will also enable installation of the bypass/reverse flow valve means 56.

The valve means 56 defines appropriate valve seat and valve seal means to permit the functioning of the filter assembly as above defined. That is, until the filter becomes clogged the fluid flows, as indicated by the arrows 40, 42 and 44 and 50, through the filter from inlet to outlet. Upon the filter becoming clogged and the differential pressure thereacross becoming sufficiently great, that is, to establish a predetermined threshold, the valve means 56 functions to separate seat and seal means and to permit flow of the fluid past the filter element 36. That is, the filter element is bypassed. If in fact there is a reverse flow then the check valve 46 precludes flow in a reverse direction through the filter, that is, opposite to the direction indicated by the arrows 42 but again separates seat and seal means to permit flow directly from the outlet port 34 to the inlet port 32 past the filter. The details of the structure of one embodiment of the valve means constructed in accordance with the principles of the present invention will now be discussed in detail with reference to FIG. 3.

Figure 3:
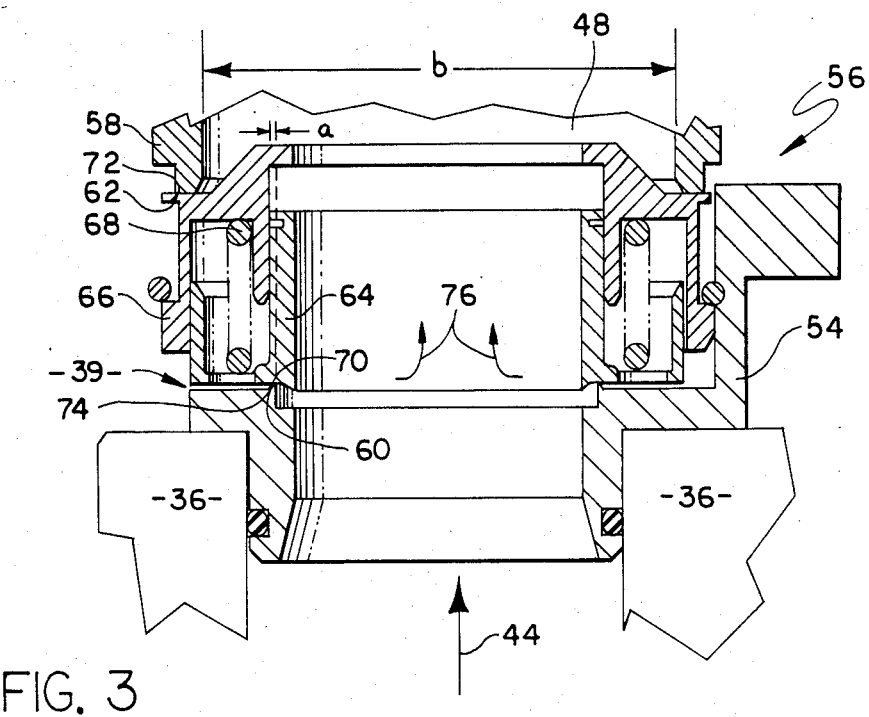
FIG. 3 is a cross sectional view further illustrating the valve as shown in FIG. 2 and particularly its manner of operation in the bypass mode.

As is shown in FIG. 3, the valve means 56 is seated within the adaptor 54 and abuts against a circular rim 58 which forms a portion of the housing and provides a valve seat for a portion of the valve means 56 as will be more fully described hereinafter. The adaptor 54 also provides a continuous valve seat 60 as again will be more fully described hereinafter. Positioned between the valve seats 60 and 62 are first and second ring members or valves 64 and 66 which are telescopically received one relative to the other. The ring members are retained in place within the adaptor 54 by a retainer ring 65. Thus, the assembly may be formed with the rings 64 and 66 and the spring 68 dropped within the adaptor 54. The assembly may then be seated within the housing 30 to provide the desired bypass/reverse flow operation. The ring valves 66 and 64 are urged apart by the spring 68 received therebetween. Through biasing of the ring valves 64 and 66 apart, the surfaces 70 and 72 seal against the seats 60 and 62, respectively, thereby precluding flow of fluid except through the filter element 36 as above described during normal forward flow operation of the system.

It will be recognized by those skilled in the art that the chamber 39 is subjected to system pressure from the source 10, that is, the pressure appearing in conduit 14 (FIG. 1), while the chamber 48 is subjected to the pressure of the fluid subsequent to its being filtered, that is, the pressure which appears in the conduit 16 (FIG. 1). When the filter element 36 clogs with foreign contaminants and the differential pressure thereacross reaches a predetermined threshold, the effective force generated through application of the pressure differential across the area at 74 having a dimension "a", overcomes the threshold level established by the spring 68 and causes the ring 64 to move upwardly as viewed in FIG. 3 thus moving the seal 70 away from the seat 60 thereby permitting the flow of fluid through the thus generated opening as shown by the arrows 76, completely bypassing the filter element 36 and thence upwardly into the chamber 48 and out through the outlet port 34. As above indicated, typically when such occurs an indicator will be activated providing a signal to the operator that the filter 36 should be changed and/or cleaned in order to again cause the system to operate as intended. During the bypass flow operation and the normal forward flow operation of the system constructed in accordance with the present invention, the upper ring 66 of the ring valve means remains non-functional.

Figure 4:
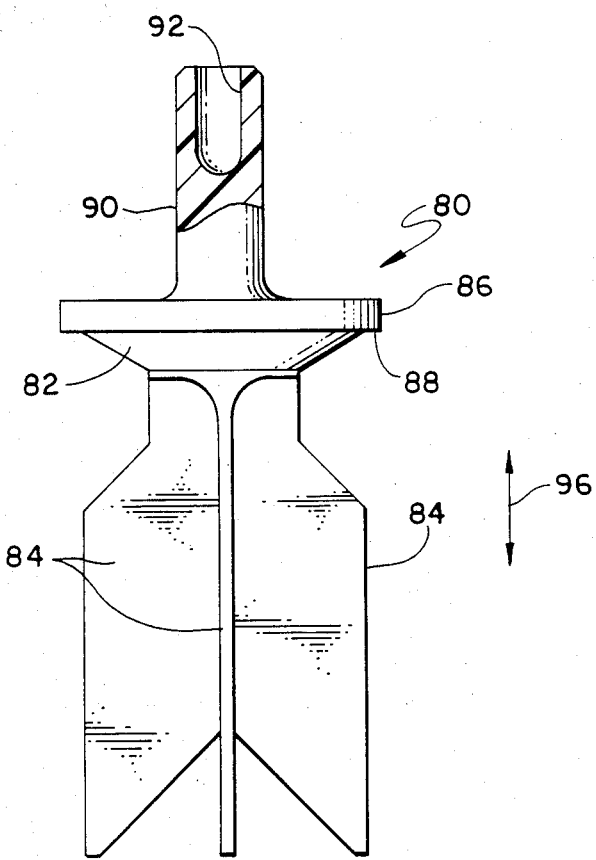
FIG. 4 is a plan view, partly in cross section, of a check valve for reverse flow constructed in accordance with the present invention.

Through the utilization of a check valve which is shown in detail in FIG. 4 the upper ring 66 will function as a reverse flow valve. The check valve 80 is preferably constructed from a molded plastic member of extremely light material and is disposed on the forward flow downstream side of the opening through the valve means. As is illustrated, the check valve 80 includes a body 82 having a plurality of downwardly depending angularly disposed webs 84 which are utilized for guide purposes within the hollow interior defined by the ring valve 64 and the adaptor 54 through which fluid normally flows, either as indicated at 44 or 76. The body 84 has a radially outwardly extending flange 86 formed therewith and flange 86 defines a valve seal 88 along the lower surface thereof. An upwardly extending extension 90 extending transverse the flange 86 defines a re-entrant bore 92 which receives a guide pin 94 as shown in dashed lines in FIG. 2. In this manner the guide pin received within the bore 92 along with the webs 84 forms guide means which accurately permit movement of the check valve in a reciprocal fashion as illustrated by the arrow 96 in FIG. 4. During normal operation, particularly as described with respect to forward flow in conjunction with FIGS. 2 and 3, the check valve 80 is non-functional in that the flow causes it to be removed out of the flow path as shown at 44 and/or 76.

Figure 5:
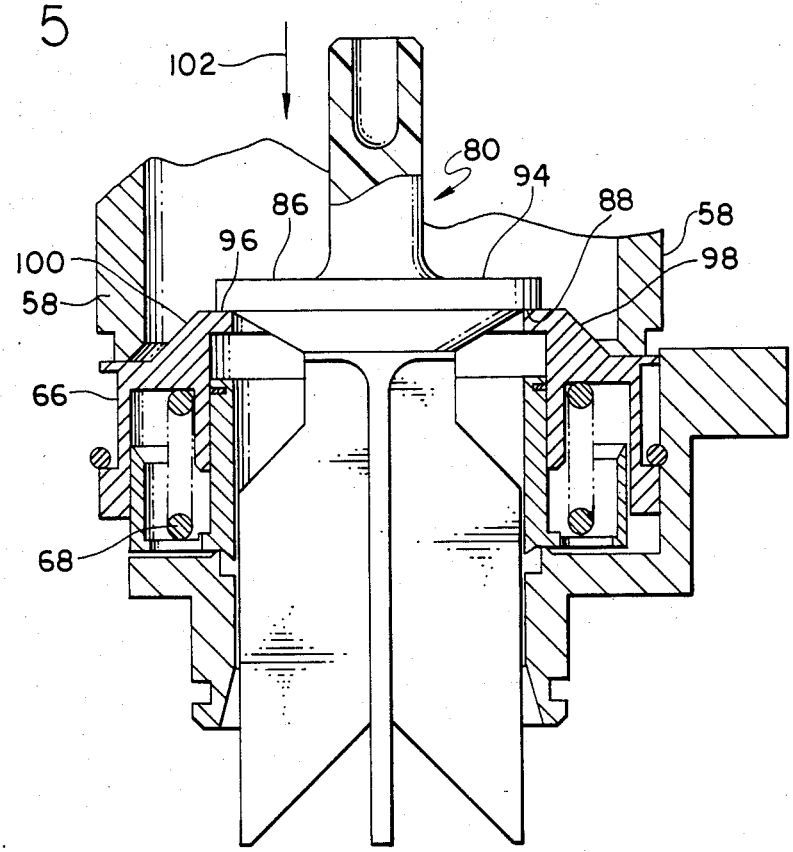
FIG. 5 is a cross sectional view of the elements shown in FIGS. 3 and 4 assembled and further illustrating the reverse flow permitted by the valve.

By reference now to FIG. 5, the operation of the check valve will be more fully described. As will be recognized by those skilled in the art, FIG. 5 is a composite of FIGS. 3 and 4 with the check valve 80 in position. When reverse flow is called for, causing the fluid to enter through the outlet port 34, a force is applied to the upper surface 94 of the body 82 causing the check valve to move downwardly into the position shown in FIG. 5. In such a position the valve seal 88 on the lower surface of the flange 86 sealingly contacts the valve seat 96 formed on the upper surface 98 of the ring valve 66. When such occurs, the pressure of the reverse flow fluid entering the outlet port 34 acts across the upper surface 94 of the check valve 80 as well as the upper surface 100 of the ring valve 66 within the extension 58 of the housing 30 as shown at "b" in FIG. 3 to thus generate an appropriate downwardly acting force as shown by the arrow 102 acting against the spring 68. This force will overcome the pressure of the spring 68 causing the ring valve 66 to move downwardly as viewed in FIGS. 3 or 5, thereby moving the seal 62 away from the seat 72 and permitting the unrestricted flow of fluid from the load to the source as shown in FIG. 1 through the conduit 24.

Through the appropriate sizing of the areas "a" and "b" any desired bypass/reverse flow ratio may be established. In one preferred embodiment the effective area ratio was established as 25 to 1. As a result, a bypass valve set for 100 p.s.i. differential pressure actuation inlet-to-outlet flow will actuate in the reverse flow direction at 4 p.s.i. differential. By effectively decreasing the bypass flow area "a", the same valve could be designed with a 50/1 ratio of areas to effect a reverse flow valve actuation at a 2 p.s.i. differential. Such ability to properly size these areas and obtain the desired ratio increases the efficiency of the systems requiring free return of fluids while avoiding backwash of any contaminants held by the filter 36.

Figure 6:
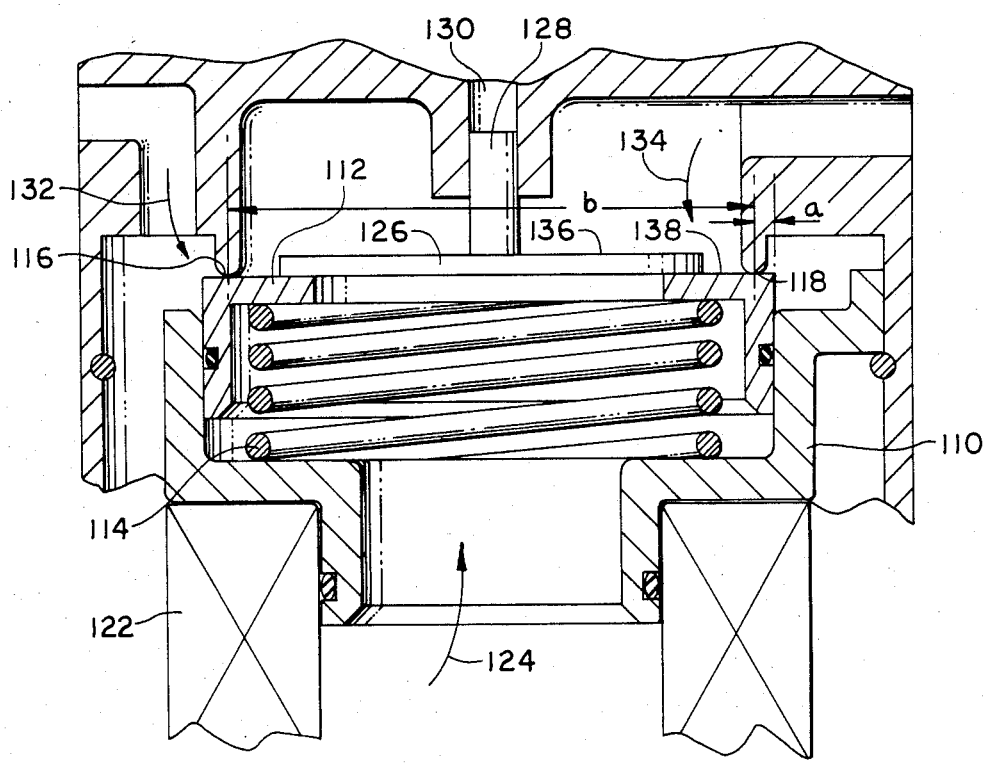
FIG. 6 is a cross sectional schematic view illustrating an alternative embodiment of a bypass/reverse flow valve constructed in accordance with the principles of the present invention.

Referring now more particularly to FIG. 6, an alternative embodiment of the reverse flow/bypass valve constructed in accordance with the present invention is illustrated. As is therein shown the adaptor 110 receives a ring valve means 112 therein which is urged outwardly by a spring 114 so that a sealing surface 116 engages a seat 118 formed on the housing extension 120. Again, typically the filter element 122 receives fluid to be filtered on the outside thereof which flows inwardly and then upwardly as shown by the arrow 124 through the coaxial opening in the tubular filter element as well as that defined by the ring valve 112. During normal operation, the check valve 126 is pushed upwardly and laterally held in place by the extension 128 which is received within the bore 130.

In the event the differential pressure acting across the area "a" and experienced across the filter 122 exceeds the predetermined threshold established by the spring 114, the valve 112 moves downwardly as viewed in FIG. 6, thus permitting fluid to bypass the filter as shown by the arrow 132.

In the event that there is a reverse flow as shown by the arrows 134, such flow acts upon the surface 136 of the check valve 126 as well as the inwardly extending surfaces 138 of the ring valve 112, thus providing an effective area "b" for generating a sufficient force to move the valve 112 downwardly as shown in FIG. 6, thus providing a reverse flow in the opposite direction through the same opening as provided for the bypass flow. It should be noted that in both instances the bypass flow and the reverse flow avoid flow through the filter element 122. Again the effective areas "a" and "b" may be sized to provide the desired ratio to accommodate the parameters of any particular system. It will also be noted that the device as shown in FIG. 6 may also be "dropped in" to an existing filter housing to provide the bypass/reverse flow capabilities as may be desired and is also exceedingly simple, easy to install and maintain.

What is claimed is:

1. In a filter assembly having a housing including a fluid inlet and outlet, a tubular filter element seated within said housing for filtering fluid under pressure flowing from said inlet to said outlet, the improvement for providing bypass and reverse flow capability through flow paths other than said filter element comprising:
   ring valve means including first and second ring members telescopically received one within the other and having first and second surfaces and an opening disposed coaxially with said filter element and including fluid sealing means, the first surface being exposed to fluid under pressure before filtering thereof and the second surface being exposed to said fluid after filtering thereof;
   spring means biasing said ring members in opposite directions and sealing means into sealing engagement during normal operation of said filter assembly;

said sealing means opening against said spring bias responsive to said filter element becoming plugged and generating a first differential pressure thereacross which is applied across said first and second surfaces to allow unfiltered fluid to flow from said inlet to said outlet without passing through sasid filter element; and reverse flow check valve means disposed to close said opening to prevent fluid flow from said outlet to said inlet through said filter element, said check valve means, responsive to said fluid flow from said outlet toward said inlet generating a second differential pressure, opening said sealing means to allow fluid to flow freely from said outlet to said inlet, said second differential pressure being less than said first differential pressure.

2. The improvement as defined in claim 1 wherein said sealing means includes seat means and seal means and said seat means includes first and second continuous seal surfaces contacted by said first and second ring members respectively.

3. The improvement as defined in claim 2 which further includes adaptor means received by said filter element and defining said first continous seal surface.

4. The improvement as defined in claim 3 wherein said first and second ring members and said spring means are received within said adaptor means and which further includes retainer means for maintaining said ring means within said adaptor means.

5. The improvement as defined in claim 4 wherein said second seat means includes a continous seal surface defined by said housing.

6. The improvement as defined in claim 1 wherein said check valve means includes a radially outwardly extending flange disposed on the forward flow downstream side of said opening through said valve means, said flange being imperforate and having a diameter greater than the diameter of said opening whereby forward flow of said fluid closes said check valve.

7. The improvement as defined in claim 6 wherein said check valve means further includes guide means extending transverse said flange for maintaining said flange in position relative said opening.

8. The improvement as defined in claim 7 wherein said guide means include a plurality of angularly disposed webs.

* * * * *